US008160929B1

(12) United States Patent
Park et al.

(10) Patent No.: US 8,160,929 B1
(45) Date of Patent: Apr. 17, 2012

(54) LOCAL ITEM AVAILABILITY INFORMATION

(75) Inventors: Joseph C. Park, Redmond, WA (US); Kian Fai Leong, Singapore (SG)

(73) Assignee: Amazon Technologies, Inc., Reno, NV (US)

( * ) Notice: Subject to any disclaimer, the term of this patent is extended or adjusted under 35 U.S.C. 154(b) by 1530 days.

(21) Appl. No.: 11/536,593

(22) Filed: Sep. 28, 2006

(51) Int. Cl.
*G06Q 30/00* (2006.01)

(52) U.S. Cl. ...................................................... 705/26.1

(58) Field of Classification Search ............ 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | | |
|---|---|---|---|---|
| 5,712,989 A | * | 1/1998 | Johnson et al. | 705/28 |
| 5,758,328 A | * | 5/1998 | Giovannoli | 705/26.4 |
| 5,842,178 A | * | 11/1998 | Giovannoli | 705/26.4 |
| 6,554,183 B1 | | 4/2003 | Sticha et al. | 235/379 |
| 6,823,389 B1 | * | 11/2004 | Satomi et al. | 709/227 |
| 6,917,922 B1 | | 7/2005 | Bezos et al. | 705/27 |
| 6,917,941 B2 | | 7/2005 | Wight et al. | 707/10 |
| 7,236,983 B1 | * | 6/2007 | Nabors et al. | 1/1 |
| 7,315,833 B2 | * | 1/2008 | Schrenk | 705/26.62 |
| 7,596,513 B2 | | 9/2009 | Fargo | 705/26 |
| 7,752,209 B2 | | 7/2010 | Ramer et al. | 707/752 |
| 7,774,331 B2 | | 8/2010 | Barth et al. | 707/706 |
| 7,945,484 B1 | | 5/2011 | Tam et al. | 705/26.41 |
| 2002/0032611 A1 | * | 3/2002 | Khan | 705/26 |
| 2002/0065769 A1 | * | 5/2002 | Irribarren et al. | 705/37 |
| 2002/0072983 A1 | * | 6/2002 | Teller | 705/26 |
| 2003/0046173 A1 | | 3/2003 | Benjier et al. | 705/26 |
| 2003/0177076 A1 | | 9/2003 | Might et al. | 705/28 |
| 2004/0093233 A1 | * | 5/2004 | Teller | 705/1 |
| 2004/0093257 A1 | | 5/2004 | Rogers et al. | 705/10 |
| 2004/0117294 A1 | * | 6/2004 | Ferraro et al. | 705/37 |
| 2005/0097005 A1 | | 5/2005 | Fargo | 705/26 |
| 2006/0031123 A1 | | 2/2006 | Leggett et al. | 705/26 |
| 2006/0138219 A1 | | 6/2006 | Brzezniak et al. | 235/383 |
| 2007/0107008 A1 | * | 5/2007 | Dybus | 725/9 |
| 2007/0244750 A1 | | 10/2007 | Grannan et al. | 705/14 |

FOREIGN PATENT DOCUMENTS

KR  2001-0096357  11/2001

OTHER PUBLICATIONS

Margaret L. Sheng, "The Impact of Internet-Based Technologies on the Procurement Strategy", The Second International Conference on Electronic Business, Taipei, Taiwan, Dec. 10-13, 2002.*

(Continued)

*Primary Examiner* — Naeem Haq
(74) *Attorney, Agent, or Firm* — Seed IP Law Group PLLC

(57) ABSTRACT

Techniques are described for determining merchants that are able to provide items of interest. In some situations, consumers or other users supply requests for information about particular items of interest, and appropriate local merchants that are currently available to provide those items are identified and indicated to the users who made the requests. The identification of such appropriate local merchants may include automatically contacting human representatives of potentially appropriate merchants in order to automatically solicit information about the merchant, such as quantity and pricing information for items currently available in local inventory and current operating hours. The described techniques may be performed in an automated manner by an item availability information system, such as to provide a corresponding item availability information service to users (e.g., in exchange for fees from users).

58 Claims, 16 Drawing Sheets

OTHER PUBLICATIONS

Canada Newswire "Call Genie and Yellow Pages Group plan launch of telephone based interactive voice access to the Yellow Pages(TM) directories" Jan. 5, 2005, 2 pages.

Evarts, "Web Shopping That Keeps Dollars Local" Christian Science Monitor, p. 20, Apr. 24, 2000, 2 pages.

Mack, Ann M., "Going Local," Jul. 10, 2000, Adweek, V. 41, No. 28, pp. 38-39.

* cited by examiner

201 { Welcome to the local Item Availability Information service. You can easily find local merchants that can currently supply a particular item, and results take only a few short minutes.

Find availability of: [smucker's peanut butter] ⟩ 203

207 — Near: [Seattle, WA 98121 ▼]
Full Address, or just City & State, or just Zip 209 — Distance: ○ ○ ⦿ ○ ○ ○
(miles)  1  2  5  10  30  50

⟩ 205

Advanced Search Options — 210          [Search] — 212

What people want

> 23 people are looking for iPod Nano Black 4 GB near Fremont --
> 56 replies (1 minute ago)

> JohnDoe is looking for a used ironing board near 98119
> 23 replies (1 minute ago)

> 34 people are looking for a really good burger near Rainier Beach --
> 23 replies (1 minute ago)

> 45 people are looking for Canon A95 Digital Camera near Magnolia --
> 21 replies (1 minute ago)

> 342 people are looking for Star Wars Battlefront throughout Seattle --
> 430 replies (2 minutes ago)

⟩ 211a

Latest replies from merchants

> RadioShack in Ballard replied to people looking for iPod Nano Black 4 GB with:
> "Yes, we currently have 23 in stock." (via SMS 1 minute ago)

> ILikeBacon in Crown Hill responded to people looking for Kikoman Soy Sauce with:
> "Yes, we carry that and have plenty in stock, we also carry a different brand which is on sale..."
> (via phone 1 minute)

> Magnolia Books in Magnolia replied to people looking for the latest Cornell West book with:
> "Yes, if you're looking for Democracy Matters we..." (via SMS 1 minute ago)

> Ace Hardware in Interbay in Nickerson replied to someone looking for a gift for my wife with:
> "Yes, if your wife really enjoys spackling we have..." (via phone 2 minutes ago)

213 { Matching Categories:
Shopping > Grocery, Convenience & Liquor Stores (842 results)
Business to Business > Food > Groceries (76 results)

215 { We have found 12 potential local merchants for "Smucker's Peanut Butter".

Please select up to 5 merchants for us to contact to determine if the merchant currently has the item in stock.

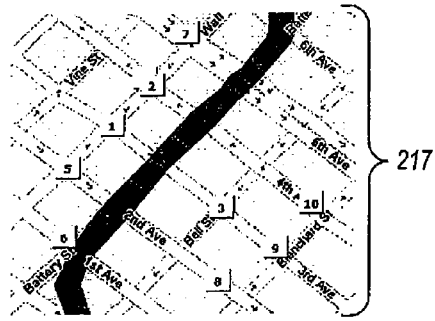
217

| | 221 | 223 | 225 | 227 | 229 |
|---|---|---|---|---|---|
| | | Contact | | Rating | Recent Results |

219 {
[1] ☐ Store AA    [▢]    ●●●○○    Price: $3.50 In-stock: Yes (5 min. ago)

[2] ☐ Store BB    [▢]    ●●●○○

[3] ☐ Store CC    [▢]    ●●●●○    Price: $2.99 In-stock: No (10 min. ago)

[4] ☐ Store DD    [▢]    ●●○○○

[5] ☐ Store EE    [▢]    ●○○○○

⋮

235 { [Sponsored]
[11] ☒ Store JJ
[12] ☒ Store KK

231 {
Default question for contacted merchants
Do you have Smucker's Peanut Butter in stock, and if so, what is the price?
☒ Should we ask this question for you?

Your additional questions (optional)
233 [                    ]

[Contact Merchants] 236

*Fig. 2B*

Category: Shopping > Electronics Stores > Portable Devices

Store AA 

(206) 555-5555

2204 A St.
Seattle, WA 98121

Cross street
Near the intersection of A St. and
Main St.

238 (bracket for above)

How to get there
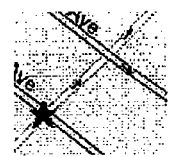
Get driving directions

240

Recent responses

> Store AA In Fremont replied to someone looking for Apple 20 GB Ipod with:
"Yes, we currently have 23 in stock." (via SMS 1 minute ago)

> Store AA In Fremont responded to people looking for AA rechargeable batteries with:
"Yes, we carry that and have plenty in stock, we also carry a different brand which is on sale..."
(via phone 1 minute ago)

242

Products this merchant carries

Apple iPod Nano 30 GB White
Canon Powershot A95

244

Company Information

Store AA has offered a wide variety of electronics since 1990.

Please wait while we contact the selected merchants on your behalf.   ⎫
The process should only take a few minutes.                            ⎬ 237
                                                                       ⎭

If you do not want to wait,                                            ⎫
    we can email you the available results  ☐ in ☐ minutes   ⎪
    Email: ☐                                                  ⎬ 239
        ☐ when all available results            ⎪
    [ Submit ]    have been acquired.                  ⎭

243
                        Contact Status    Availability &
                                     Price

|       |   |   | Contact Status | Availability & Price |
|-------|---|---|----------------|----------------------|
| [1]   | Store AA | ☐ | ●●●○○ | sending SMS |
| [4]   | Store DD | ☐ | ●●○○○ | sending email |
| [6]   | Store FF | ☐ | ●●○○○ | calling |
| [11]  | Store JJ | ☐ | ●●●○○ | sending SMS |
| [12]  | Store KK | ☐ | ●●○○○ | calling |

The results are starting to come in. Your patience is appreciated. ⎬ 247

245

Contact Status    Availability & Price

| | | | | Contact Status | Availability & Price |
|---|---|---|---|---|---|
| [1] | Store AA | | ●●●○○ | Completed | in-stock |
| [4] | Store DD | | ●●○○○ | sending email | |
| [6] | Store FF | | ●●○○○ | calling | |
| [11] | Store JJ | | ●●●○○ | sending SMS | |
| [12] | Store KK | | ●●○○○ | calling | |

*Fig. 2E*

Here are the final results. Have fun shopping for "Smucker's Peanut butter"!!!

|  |  |  | Contact Status | Availability & Price |
|---|---|---|---|---|
| 249a ⌇ 1 | Store AA | ●●●○○ | Completed | In-stock |
| 249b ⌇ 4 | Store DD | ●●○○○ | Completed | Out-of-stock |
| 249c ⌇ 6 | Store FF | ●●○○○ | Completed | 14 jars of Smuckers @ $3.49, 12oz. |
| 249d ⌇ 11 | Store JJ | ●●●○○ | Unable to contact | |
| 249e ⌇ 12 | Store KK | ●●○○○ | Completed | 25 jars of Smuckers @ $3.25, other brand is on sale |

*Fig. 2F*

Example Email-Indicating Results of item Search

From: results@item-availabilityinformation.com
Sent: Mon 6/5/20XX  9:09AM
To: UserABC@example.com
Subject: Results for "Smucker's peanut butter" in Seattle, WA  98121

|  |  | Ratings |
|---|---|---|
| Store AA:  In-stock | Directions | *** |
| Store DD:  Out-of-stock | Directions | ** |
| Store FF:  14, at $3.49 | Directions   Reserve Item | ** |

Example SMS Messages Indicating Results Of Item Searches

265

IAI system results for "Smucker's peanut butter" — Store AA: In-stock

---

285

285a   IAI system results for "Smucker's peanut butter" in 98121 — Store FF: 14, at $3.49

285b   To reserve 1 copy of the item at this merchant for a $0.50 charge, reply with "Reserve"

*Figure 2H*

Example Merchant Registration User Interface

301 { Welcome Merchant. Please provide the information below to customize your experience with the Item Availability Information System

*Fig. 3A*

303 { Name [_____]

1. Preferred method of contact
○ Telephone [_____]
○ Email [_____]
○ Instant Messaging [_____]
⋮
} 311

2a. Primary Category of Items You Provide
[_____▼]
2b. Secondary Category of Items You Provide
[_____▼]
[_____▼]
} 313

3. Hours of Operation
Mon [____] to [____]
Tue [____] to [____]
⋮            ☐ Same Hours M-F
[Advanced ...] ─317
} 315

3b. Hours to Contact
☐ Contact Time same as operating hours    ☐ Do not contact us [__] minutes before closing
} 319

3c. Maximum Contact  ☐ Do not contact us more than [__] times in an [hour ▼]
} 320

4. Holidays (closed)
☐ New Years            ⋮
☐ Martin Luther King   ☐ Thanksgiving
☐ Presidents Day       ☐ Christmas
} 321

307 ─[Reset]  [Save] ─309

Example Advertiser Registration User Interface

323 { Welcome Merchant ABC. Below are some additional features you may wish to take advantage of.

325 {
☐ Additional information to supply to potential customer

[          ]

327 {
☐ Pay-per-response (you are only charged if you choose to respond to a particular item availability query from a potential customer)

| Keyword | Bid |
|---|---|
| [     ] | [   ] |
| [     ] | [   ] |
| [     ] | [   ] |
| [     ] | [   ] |

329 ☐ Let customer reserve the requested item or service for $[     ] fee

331 {
☐ Willing to provide quantity information
☐ Willing to provide pricing information 333 {
☐ Picture or Logo

[          ] [Browse]

Preview
[     ]

335 ☐ Coupon/Promotion

⋮

337 [Save]   [Reset] 339

*Fig. 3B*

LOCAL ITEM AVAILABILITY INFORMATION

TECHNICAL FIELD

The following disclosure relates generally to techniques for providing information to users regarding merchants that are currently able to provide items of interest, such as via an item availability information service that automatically and dynamically contacts human representatives of third-party local merchants to determine if the merchants are currently able to provide a particular item.

BACKGROUND

A common problem that arises for consumers is to easily identify local merchants that can currently provide a particular item of interest, such as a product, service and/or information that is available for purchase, rent, lease, license, trade, evaluation, sampling, subscription to, etc. While various techniques exist for locating a merchant that might provide an item of interest, problems exist with these existing techniques.

For example, yellow pages directories, such as those created by local telephone companies or other private companies, are one place that people may look to locate potential merchants. However, a number of problems exist with such yellow page directories. As one example, such yellow pages directories are typically made available in paper form, and may not always be accessible when needed. In addition, even if they are available, the yellow pages are typically categorized at a high-level, and may fail to provide sufficient information to determine whether a particular category of merchant or a particular merchant within a category would sell or otherwise provide a particular item. For example, a consumer interested in locating a particular brand of golf ball may be unable to determine whether merchants listed under a general "sporting goods" category would even carry golf supplies, let alone the particular golf ball item of interest. Thus, it is typically necessary for a consumer to manually telephone multiple merchants to determine if the merchants can currently provide the desired item, which is time-consuming. Furthermore, such yellow pages directories typically do not provide information about merchants' hours of operation (e.g., to enable a determination of whether the merchant is currently open), and when the yellow pages directories cover large geographic areas, it is often difficult to determine whether a particular merchant is nearby.

Some online local search services have also become available via the Internet, but they typically suffer significant problems from incomplete and inaccurate data. For example, such local search services may rely exclusively on data from Web pages of merchants, which excludes numerous local merchants without such Web pages. In addition, even if a merchant has a Web site with one or more Web pages, most merchants do not list at least some items (and often any items) that the merchant sells on their Web site, and do not typically provide information about current stock or other availability of particular items. A very few merchants (e.g., some large national retailers) may provide some data regarding products that they sell via electronic data feeds, but such provided data will still typically lack at least some useful information (e.g., hours of operation for the retailer), and the participating merchants will typically not include merchants that provide certain types of items (e.g., at least some services). Thus, such local search services will often fail to identify local merchants that are currently available to provide a particular item, and even if such a search service is able to provide information about a local merchant that might carry a particular item, a consumer typically still has to manually contact each such merchant separately to determine if the merchant is currently able to provide the item (e.g., currently has a product item in local inventory and is currently open to sell the product).

Thus, it would be beneficial to provide techniques to improve the ability of consumers to locate local merchants that are currently able to provide an indicated item, as well as to provide other benefits.

BRIEF DESCRIPTION OF THE DRAWINGS

FIGS. 2A-2H illustrate examples of interactions between consumers and an embodiment of an item availability information system in order to provide information to the consumers regarding local merchants currently able to provide items of interest.

FIGS. 3A-3B illustrate examples of interactions between merchants and an embodiment of an item availability information system in order to obtain information about available items.

DETAILED DESCRIPTION

Techniques are described for determining merchants that are able to provide items of interest. In some embodiments, consumers or other users supply requests for information about particular items of interest, and corresponding local merchants that are currently available to provide those items are identified and indicated to the users who made the requests. The identification of appropriate local merchants may be performed in an automated manner in at least some embodiments by an item availability information system, such as to provide a corresponding item availability information service to users (e.g., in exchange for fees from users or other compensation).

Figure 1:
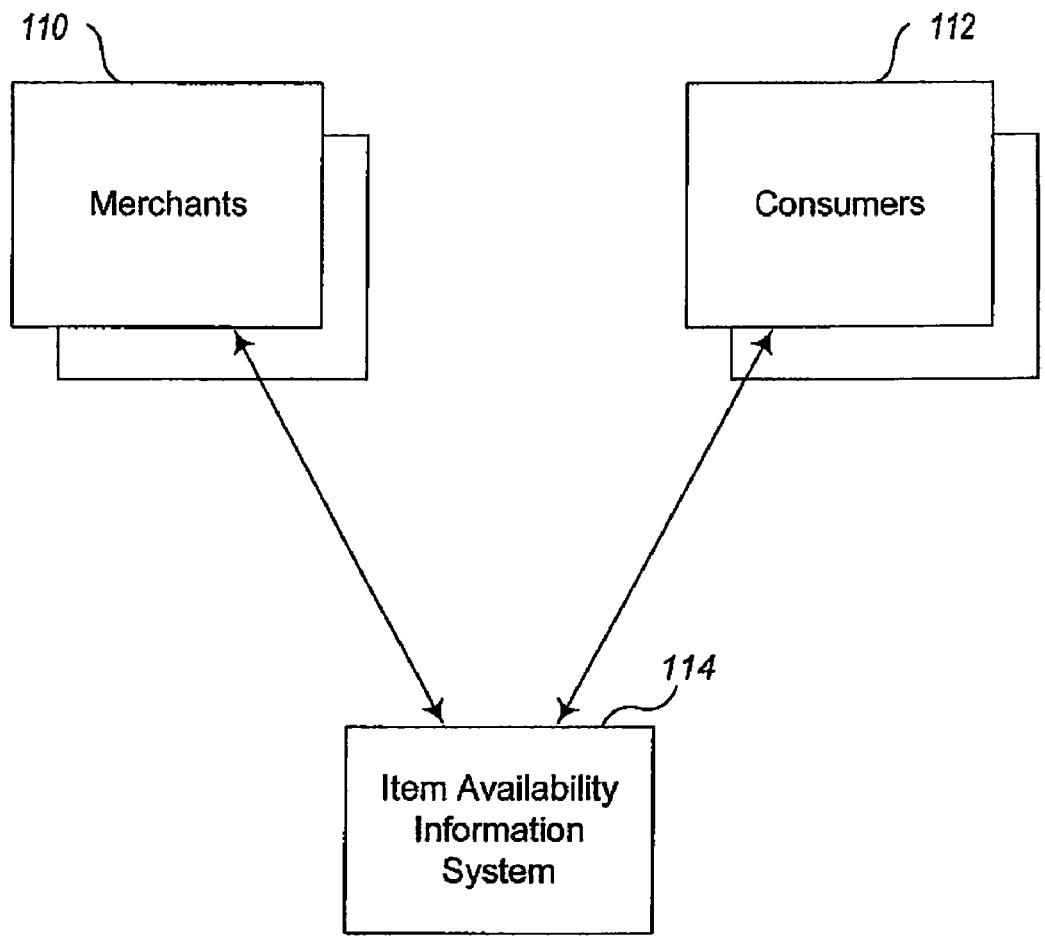
FIG. 1 illustrates an example embodiment of an item availability information system capable of interacting with merchants and consumers to provide the described techniques.

FIG. 1 illustrates an example embodiment of an item availability information system capable of interacting with consumers and merchants to provide information about merchants that are currently available to provide items of interest. In particular, FIG. 1 illustrates an item availability information system 114 that interacts with various consumers 112 and merchants 110. For example, the consumers may send requests to the item availability information system (e.g., by interacting with a Web site of the item availability information system, not shown) for information about merchants currently available to provide particular items of interest, and the item availability information system provides information back to the consumers after appropriate merchants are identified (via the Web site and/or using other electronic communications, such as via telephone, email, instant messaging, text messaging, SMS or MMS messages, etc.). In some embodiments, at least some consumers may also interact with the item availability information system in other ways, whether in addition to or instead of via a Web site, such as by sending requests for information and other types of communications using one or more of various other types of electronic communications, such as email, instant messaging, text messaging, SMS or MMS messages, telephone calls to an automated response system, etc. Such types of electronic communications may, for example, enable consumers to request information about items while traveling or otherwise away from a computing device with Internet access, such as to identify merchants that are nearby to a current location of the consumer. Various communications also occur between the item availability information system and the merchants as part of identifying appropriate merchants that are currently available to provide a particular indicated item, including when the item availability information system automatically contacts human representatives (not shown) of merchants to obtain information about the current availability of the indicated item at the merchant, such as by obtaining responses to questions about whether the indicated item is currently in stock. Additional details regarding interactions with consumers and merchants are included below.

The identification of local merchants that are currently available to provide particular items of interest may be performed in various ways in various embodiments. In at least some embodiments, merchants are identified as being local for a particular request using one or more geographic criteria, such as to select merchants that are near a user who supplied the request (e.g., within a user-specified or predetermined distance from the user or another indicated location; within a government-defined geographic area, such as an area associated with a zip code or telephone area code, or a boundary of a city or county or neighborhood; etc.). Potential local merchants that might currently be available to provide a particular item are then identified in one or more of various ways, as discussed in greater detail below. Next, human representatives of one or more of those potential local merchants are contacted in one or more of various ways to determine if the merchant is currently available to provide the particular item, such as based on the merchant having a desired number of copies of the particular item in stock as part of a current local inventory of the merchant and/or based on the merchant being open for business at a current and/or other indicated time. In at least some embodiments, information is obtained and provided to a user in a substantially immediate or real-time manner about one or more local merchants that are currently available to provide an indicated item as requested, such as within a few minutes of the request being made by the user.

As noted above, potential local merchants that might currently be available to provide a particular item may be identified in various ways in various embodiments. In some embodiments, at least some such potential merchants may already be known to carry items that are of the same type as the particular item of interest or that are otherwise similar to the item of interest, or may already be known to carry the particular item of interest. In such situations, however, it may not be known whether the merchant currently has one or more particular items in current local inventory (or is otherwise available to obtain or produce such items within an indicated time of limited duration, such as an amount of travel time for a user to reach the merchant). Merchants may be known to carry particular items or types of items in various ways, including based on information previously provided by or for the merchants, as discussed in greater detail below. In some embodiments, however, at least some potential merchants may not already be known to carry a particular item of interest or similar items, but instead may be automatically determined as possibly carrying the item of interest and/or similar items, such as within a predetermined degree of likelihood. A merchant may be identified as possibly carrying particular items or types of items in various ways in various embodiments, including based on one or more merchant categories to which the merchant belongs (e.g., yellow page directory categories), one or more groups to which the merchant belongs (e.g., an association of a particular type of retailer), the merchant's name, the merchant's location (e.g., if co-located with other merchants or businesses that typically provide similar or complementary services), information that the merchant makes available on a Web site or via another source, information from a third-party source (e.g., a governmental regulatory body, a trade publication, a local newspaper, etc.), professional certifications (e.g., if the merchant provides a regulated service), etc. Additional details are included below related to identifying merchants that potentially may have a current availability to provide one or more copies of an indicated item.

As noted above, human representatives of potential local merchants may be contacted in one or more of various ways to determine if the merchant is currently available to provide a particular item. In at least some embodiments, the item availability information system automatically telephones a business number of the merchant, and uses automated interactive voice recognition ("IVR") technology to prompt a human representative at the business to provide information of interest. Such information that may be obtained from a human representative of a business may include whether the merchant carries a particular item but does not currently have any (or an indicated number) of copies in local stock, a quantity of a particular item that the merchant currently has available in local stock, current pricing information for one or more copies of the indicated item (whether for any customer, for a particular customer, for a customer having particular attributes, etc.), information about one or more other items or types of items that the merchant may carry in inventory and/or currently has in stock (e.g., for future use in identifying the merchant as being a potential source of a copy of those other items), information about hours of operation of the merchant, whether the merchant is willing to reserve or otherwise hold one or more copies of a particular item for a limited period of time until the user arrives (e.g., for a fee), responses to one or more questions supplied by a user as part of a request, etc. Additional details related to types of information that may be obtained for merchants is included below. In addition, in at least some embodiments, merchants may further be contacted in manners other than via automated telephone calls, including by automatically sending various types of electronic messages to which a human representative may respond (e.g., an email, instant message, text message, SMS or MMS message) and/or by using one or more humans to assist in performing the communications (e.g., by using a call center to have human operators telephone the merchants). Information to perform one or more of the various types of communications may be obtained in various ways, including from publicly accessible sources (e.g., telephone records) and/or based on information previously supplied by a representative of the merchant (e.g., as part of a registration process with the item availability information system, or as indicated as a preferred future contact method during a prior contact using a different method). Additional details are included below related to contacting potential merchants and obtaining information from such merchants.

The described techniques may be used to identify merchants that can currently provide a wide variety of items, including products, services and/or information that is available for purchase, rent, lease, license, trade, evaluation, sampling, subscription to, etc. While the item availability information system may in some embodiments provide information about multiple types of items (e.g., any type of item), in other embodiments the item availability information system may be limited to use with one or more particular types of item. In some embodiments, a consumer or other user may identify multiple related types of items, such as to locate a merchant that can provide both a product and a related service (e.g., a product and installation services for that product). The consumers or other users who interact with the item availability information system may likewise be of various types in various embodiments, such as a household consumer or a representative of a business customer.

In some embodiments, the item information availability system may provide some or all of the described functionality in a manner without charge to users and/or to merchants, such as if revenue is generated by the system in other manners (e.g., via advertising to users and/or merchants). In other embodiments, users and/or merchants may pay fees for some or all of the functionality provided. In addition, in some embodiments the item information availability system may provide additional functionality to at least some entities in exchange for fees, such as to allow merchants (and others) to pay to have advertisements or other information about the merchants be displayed or otherwise provided to users in certain circumstances. As one example, the item information availability system may provide pay-per-response capabilities in which advertisers are dynamically provided opportunities for their information to be provided to users as part of the responses to particular user requests, and are charged a fee if the advertiser elects to include their information in the responses to those requests. For example, an advertiser may specify one or more keywords or other criteria. If an item indicated by a user or other information in a user request matches the keywords or other criteria, the advertiser may be contacted to be given an opportunity to elect to pay to have advertiser-specified information be provided to that user in response to that request. If the advertiser affirmatively elects to have their information included in the response to the request that is provided to that user, the advertiser is charged a fee (e.g., a standard fee for some or all advertisers, or an amount that the advertiser bid when they supplied their keywords or other criteria). Alternatively, in some embodiments the advertiser is not charged the fee (or charged a lesser fee) if the advertiser is a merchant that would otherwise have been contacted to obtain information about current availability to provide the indicated item, such as based on a selection of that merchant by the user or if the item availability information system would otherwise have selected that merchant. Additional details related to pay-per-response capabilities and to various types of electronic communications between users and an information-providing system are described in commonly assigned co-pending U.S. patent application Ser. No. 11/396,286, filed Mar. 31, 2006 and entitled "Facilitating Content Generation Via Messaging System Interactions", which is hereby incorporated by reference.

In some embodiments, a consumer or other user may further indicate other information to the item availability information system to be used when determining local merchants that are currently available to provide indicated items. For example, in some embodiments the user may indicate one or more times in which an indicated item is desired (e.g., as part of one or more time periods, such as a period of time from a current time until a selected future time), and only merchants that are able to provide the item in that time are indicated to the user. In addition, in some embodiments a user may specify one or more questions or types of information that are interest, and the item availability information system may automatically query some or all contact merchants to obtain that information. The item availability information system may then provide some or all of that obtained information to the user. In addition, at least some information that is obtained from merchants may be stored and later used in various ways, such as to facilitate responses to later requests from other users.

For illustrative purposes, some embodiments are described below in which particular types of item merchants are identified and contacted in particular ways in order to determine whether the merchants are able to currently provide items of interest, such as in response to particular types of requests from particular types of users. However, it will be appreciated that the described techniques may be used in a wide variety of other situations, and that the invention is not limited to the exemplary details provided.

FIGS. 2A-2H illustrate examples of interactions between a consumer and an embodiment of the item availability information system in order to provide information to a consumer regarding local merchants having currently availability to provide an item indicated by the consumer. In particular, FIG. 2A illustrates an example user interface that may be displayed to a consumer to enable the consumer to specify an indicated item of current interest as well as other related information. In this example, the initial displayed information includes instructional information 201 for the consumer, a section 203 in which the consumer can specify the indicated item of interest, a section 205 to indicate information about a geographical area of interest from which local merchants may be selected, a section 211 to indicate previous searches and results, and various user-selectable controls. The item indicated in section 203 may be described at varying levels of specificity, such as highly detailed (e.g., Tylenol® Extra Strength Liquid, 8 oz.) or more general (e.g., Tylenol® medicine), and in some embodiments may further not specify a single item (e.g., a nightstand, or a gift for my wife).

Section 205 includes a geographical location section 207 (e.g., to indicate the current location of the consumer, or the planned location of the consumer at a time in the near future) and a section 209 to indicate the distance the consumer is willing to travel. In other embodiments, a current geographical location may be determined automatically in various ways based on available information about the consumer and/or the computing device used by the consumer (e.g., based on stored information from prior interactions with the consumer, by geo-locating the IP address of the computing device, by using GPS ("Global Positioning System") for mobile devices with corresponding capability, by performing a reverse lookup on a telephone number available for the consumer, etc.). In some embodiments, a neighborhood or other geographical area may be specified, such as reflected in examples in section 211a of recent searches for various Seattle neighborhoods (e.g., Rainer Beach, Magnolia, and Fremont).

In this example, advanced options to define parameters of the search (e.g., the exact local area to be searched) are available by clicking on the "Advanced Search Options" user-selectable control 210. For example, a consumer may define a local area of interest by excluding one or more geographical areas from being considered local, whether for an individual search or as part of the consumer's preferences. Such exclusions may be made for various reasons, such as the excluded areas not being easily accessible (e.g., because of a geographical barrier between the areas excluded and the consumer, a lack of roads that run between the areas excluded and the consumer, or a lack of parking near the merchant). Moreover, whether instead of or in addition to excluding one or more areas, a consumer may be able to indicate that the consumer prefers one or more areas to other areas. For example, if a consumer lives near a governmental border, the consumer may prefer a merchant within or outside of a particular government-defined geographical border (e.g., to avoid or reduce sales tax, custom duties, legal restrictions associated with crossing the border, etc.).

Other options may also be available in some embodiments, such as by clicking on the "Advanced Search Options" user-selectable control 210. For example, a consumer may be allowed to specify multiple items, such as to find merchants that are currently available to provide some or all of the indicated items. A consumer may also be allowed to specify other types of information, such as one or more times at which the item availability is to be determined, a quantity of copies of the item, attributes of the indicated item (e.g., color, manufacture year, edition, type (e.g., CD versus tape, paperback versus hardcover), size, a license or certification (e.g., for a service provider), an indicated number of years of experience (e.g., for a service provider), etc. More generally, in some embodiments a consumer may be able to specify one or more questions for which responses are obtained from appropriate merchants that are indicated to the consumer.

In this example, section 211 has two subsections, those being a first subsection 211a that shows recent searches by consumers for items and a second subsection 211b that shows recent results from merchants. In some embodiments, the displayed recent results from the merchants correspond to the displayed recent searches, and may alternatively be intermingled. In some embodiments, the searches that are selected to be displayed may be based on recency of the search, on the popularity of the search, on a location entered in section 205, on an item or type of item indicated in section 203, and/or to contain searches for a variety of types of items to remind consumers of the available functionality of the system.

After the consumer enters the information in section 203 and optionally in section 205, the information is submitted to the item availability information service as a request in this example by selection of the "Search" control 212. In this hypothetical example, the consumer searches for "Smucker's peanut butter" at a local merchant within 5 miles of a specified zip code for Seattle, Wash. By selecting the "Search" control 212, the consumer will in this example be presented with a subsequent user interface screen (e.g., a next Web page) as shown in FIG. 2B to allow the consumer to select merchants to contact for additional information. While not shown here, in some embodiments the consumer may be asked to clarify his/her indicated item. For example, if the consumer is looking for "pipe", the consumer may be prompted to clarify whether the consumer wants a tobacco pipe or plumbing pipe, or if looking for "wire" to clarify a particular type of wire.

In some embodiments, a consumer may be presented with information about potential merchants who may have current availability of an indicated item and be allowed to select merchants to be contacted in order to determine their current availability. In particular, FIG. 2B illustrates an example of such functionality, and includes category information 213, an informational section 215, a map 217 of the potential local merchants, a section 219 indicating the potential local merchants, a section 231 to specify a default question to be asked of each contacted merchant, a section 233 for the consumer to specify any additional questions, a section 235 of sponsored merchants who may pay to provide this information to the consumer and/or to be included in the final results provided to the consumer, and a user-selectable control 236 to initiate the contacting of the potential local merchants. In this example, the consumer selects one or more potential local merchants to contact from the merchants displayed in section 219. In some embodiments, the consumer is limited to a predefined number (e.g., 5) of merchants to contact, although in some embodiments additional merchants may be selected by the item availability information system to be contacted (e.g., merchants that have requested to be contacted as part of pay-per-response capabilities provided by the item availability information system).

In this example, the category information 213 identifies one or more categories of merchants displayed in section 219, such as to provide feedback to the consumer regarding the types of merchants considered to be relevant for the indicated item. If the consumer determines to modify the description of the indicated item to produce better results, the consumer may be allowed to return to the page illustrated in FIG. 2A and/or may be able to directly select one or more merchant categories.

Section 219 includes various information and controls for each potential local merchant in this example. In particular, in the illustrated example these include a user-selectable control 221 (e.g., a checkbox) to select the merchant to be contacted, the name of the merchant 223, a photo or logo 225 (if any), a rating 227, and recent results 229 for the indicated item at the merchant. While not shown here, a variety of types of additional information may be displayed in other embodiments, such as messages specified by the merchant (e.g., messages configured in section 325 of FIG. 3B), advertisements from the merchants (e.g., text links or graphical advertisements), a description of the merchant, an indication of whether the merchant supplies price and/or quantity information, whether the merchant allows items to be reserved (and if so, at what price, if any), a user-selectable control for the user to rate the merchant, a user-selectable control to display a map (e.g., a map containing just the location of this merchant), hours of operation of the merchant (if known), whether the merchant is closed for a holiday (if applicable), etc. Similarly, in other embodiments less information may be displayed to the consumer than is present in FIG. 2B, such as to not present recent results.

In this example, section 231 allows the consumer to select whether to query potential local merchants regarding current item availability and price, although in other embodiments the consumer may not be allowed to specify whether such a default query will be made. In this example, section 233 further allows the consumer to specify one or more additional questions to be asked to each of the contacted merchants on behalf of the consumer. In some embodiments, the additional questions may be screened for pranks and curse words before the questions are asked to the merchant. In some embodiments, the ability to ask additional questions may be restricted by the method of contacting a merchant. For example, additional questions may not be available if the merchant is being contacted by SMS ("Short Message Service"), but available if the merchant is being contacted by telephone. In some embodiments, the additional questions may be confined to yes-or-no questions, although in other embodiments more open-ended questions may be asked (e.g., "What accessories do you have available that go well with the indicated item?")

After optionally selecting one or more of the potential local merchants and optionally specifying additional questions, the consumer proceeds in this example by selecting the "Contact Merchants" user-selectable control 236. In response, the consumer will in this example be presented with a subsequent user interface as shown in FIG. 2D, which indicates that the system has initiated contacting the selected merchants.

Alternatively, the consumer may elect to obtain additional information about one or more of the potential merchants using functionality displayed in FIG. 2B, such as by selecting the name of the merchant if it is displayed as a user-selectable control (e.g., a URL or other hyperlink). The additional information may take a variety of forms, including ratings, hours of operation, a textual description, current promotions, etc. In addition, while in some embodiments the additional information may be displayed as part of FIG. 2B, in the illustrated embodiment the additional information is displayed as part of another user interface screen as illustrated in FIG. 2C. In particular, FIG. 2C illustrates information about a selected merchant Store AA, including a section 238 containing general information about the merchant, a map 240 for the merchant, a section 242 indicating recent responses from the merchant, a section 244 containing items that the merchant is known to sell (whether or not in current inventory), and a section 246 that provides a description of the merchant. In other embodiments, additional information may be presented, such as items that the merchant does not provide, information about owners and/or employees of the merchant, or a section to initiate a new item search. In this example, section 238 with general information includes contact information for the merchant, ratings, and cross streets, and may further include information such as the length of the association with the item availability system, the number of responses via the item availability system, hours of operation, parking availability, and additional messages supplied by the merchant. In this example, section 242 with recent responses may include, for example, a predetermined number of the most recent searches and/or the most popular recent searches for this merchant. In this example, section 244 lists a predetermined number of popular items that the merchant is known to carry, and a user-selectable control (not shown) may be provided to allow a consumer to see a complete list of items that the merchant is known to sell.

FIG. 2D is an example user interface screen that is displayed to a consumer to indicate that the identification has been initiated of appropriate local merchants that currently are available to provide an indicated item. As previously mentioned, FIG. 2D may be presented after the consumer selects the "Contact Merchants" user-selectable control 236 of FIG. 2B. If results are available quickly (e.g., if recently stored results from the selected merchants for the indicated item are available), then FIG. 2D may not be displayed, and instead information similar to that in FIG. 2E or FIG. 2F may be displayed. In this example, FIG. 2D has an informational section 237, a section 239 for the consumer to specify consumer contact information to use when providing results after they become available, and a section 241 indicating the merchants being contacted and a current status of the contact. Section 241 is similar to section 219 of FIG. 2B, but only potential merchants that have been selected to be contacted (whether by the consumer or the item availability information system) are displayed. In the illustrated example, Store BB and Store EE were not selected. Contact status indicators 243 may be displayed to the consumer to indicate that the merchants are currently being contacted, as well as to optionally indicate a method used to contact the merchant. For those consumers that do not wish to wait for the results (e.g., if the consumer is on the way to travel to one of the merchants), the consumer may use section 239 to provide contact information, so that the consumer will be contacted in the indicated manner when all of the results are available and/or in an indicated number of minutes with whatever results are available at that time. Although section 239 requests an email address in the illustrated embodiment, contact information for other communication mechanisms may be requested in other embodiments. Alternatively, if the consumer has already previously indicated a contact preference and corresponding contact information, such a section may not be displayed.

In some embodiments, as individual potential merchants indicate whether they are currently available to provide the item, those results are incrementally indicated to the consumer, although in other embodiments results may not be indicated until all the results are received. FIG. 2E illustrates an example user interface showing intermediate results in column 245, as well as an informational message 247. In the illustrated user interface, Store AA has indicated that the indicated item is currently in stock. In some embodiments, additional information may also be displayed, such as user-selectable controls to reserve the indicated item, or to get additional information regarding the merchant such as driving directions, the street address, the telephone number, or the hours of operation.

Once all the results are in, FIG. 2F displays the final results to the consumer in a manner similar to that of FIG. 2E. In some embodiments, some or all of the results are available in substantially real-time, such as when potential merchants provide responses immediately when contacted and/or if at least some stored previously obtained results are relevant. In this example, FIG. 2F shows the results 249, with rows 249a-249e showing the results for each of the merchants. In addition, store FF has provided additional information about the indicated item in this example, such as the size and price of the item. In some embodiments, such additional information may include various other types of information, such as details about multiple products fitting the description of the indicated item, whether the indicated item is on store shelves, multiple sizes that are available, any bulk discounts, any current promotions, attributes of the available items (e.g., color, weight, country of origin, etc.), alternative items (e.g., similar items) that are available, etc. For example, a user-selectable control (not shown) may be provided to allow access to some or all of the additional information. Furthermore, in some embodiments a user-selectable control to reserve the indicated item is displayed for each of one or more of the displayed merchants, and extra information about at least some of the merchants may also be displayed (e.g., hours of operation, an icon indicating whether the merchant is open, holidays that the merchant is closed on, any coupons or promotions, additional messages from the merchant, etc.).

Alternatively, results may be indicated to consumers in other manners. For example, FIG. 2G illustrates an email 255 that indicates the results for a search. The email may be generated in response to a request made in section 239 of FIG. 2D or based on previously specified contact information for the consumer. In this example, the email contains a descriptive subject line (which in the illustrated embodiment contains both the item searched and the location of the request), and the various stores are listed along with the results in a manner similar to that shown in FIG. 2F. In this example, the email also contains various user-selectable links including links 257 to driving directions and a link 259 to reserve the item at a particular store, but does not include the sponsored merchants information (e.g., for those merchants that have used pay-per-response capabilities provided by the item availability information system). Additional information may be displayed as well, such as the information previously discussed with respect to FIG. 2F. FIG. 2H illustrates an alternative electronic communication mechanism for indicating search results to a user that are similar to those of FIG. 2G, but with the electronic communications in this example being multiple SMS messages 265 and 285. In particular, in this example, each SMS message is specific to a particular local merchant, with messages 265 and 285 providing information about local merchants Store AA and Store FF, respectively. Each SMS message may be sent, for example, as information about the corresponding local merchant becomes available, although in other embodiments some or all SMS messages may instead be sent together, and multiple merchants may have information shown in a single SMS message. In addition, a message is not sent in this example for Store DD since it does not have the requested item available, although in other embodiments one or more SMS messages may be sent for such merchants. Each SMS message in this example contains less information for the corresponding merchant than the example email 255 (e.g., does not provide merchant ratings or a user-selectable option to obtain directions), such as due to limited character length and/or limitations on types of functionality that may be provided via SMS messages, although in other embodiments such SMS messages may include more information than is shown. In this example, additional functionality is indicated to the user in message 285 in line 285b to allow the user to elect to reserve the item from Store FF for a fee, which is available in this example by the user taking the indicated action of replying to the SMS message with the word "Reserve" in the reply message. Various other types of functionality that are not illustrated here may similarly be provided, such as obtain additional information about a merchant if so desired (e.g., directions, ratings, store hours, etc.).

The previously illustrated user interface screens and messages are only exemplary, and may be displayed or otherwise performed in other manners in other embodiments. For example, in other embodiments more information or less information may be displayed to the consumer. Furthermore, the user interfaces may in some embodiments depend on the type of device a consumer is using, such as to have one user interface for desktop or laptop computers and to have another user interface adapted for the small displays of mobile communications devices.

As previously noted, in at least some embodiments merchants may register with the item availability information system to provide additional information about the merchant and/or to customize future interactions with the item availability information system. FIGS. 3A-3B illustrate examples of merchant interactions as part of a registration process. In particular, FIG. 3A illustrates a user interface screen that allows a merchant to specify various information, such as a section 303 for the name of the merchant, various user-selectable controls, a section 311 for specifying one or more preferred methods of contacting the merchant, a section 313 for specifying categories of items that the merchant provides, a section 315 for specifying hours of operation for the merchant, a section 319 to specify hours for the item availability information system to contact the merchant, a section 320 to indicate a maximum volume of contacts from the item availability information system, and a section 321 to indicate holidays the merchant observes.

Since the item availability information system may in some embodiments be seeded with merchant information from multiple sources, such as the yellow pages and/or public sources of information (e.g., business license database, professional licenses), a merchant who is performing a registration may have at least some of their information be displayed as default information that the merchant can modify if appropriate. The item categories made available may take various forms in various embodiments, and in some embodiments the merchant may be able to specify particular items that the merchant provides, whether instead of or in addition to the item categories. The merchant may specify items and item types in various other manners, such as by providing a list of unique identifiers (e.g., ISBNs for books, UPC codes for consumer goods, etc.) for the items or a data feed specifying the items.

In this example, section 315 allows the merchant to specify the hours of operation that the merchant is open. The hours may be displayed to the consumer or used in determining which merchants to display to the consumer. After the "Advanced" user-selectable control 317 is selected in this example, the merchant may specify advanced schedules regarding the hours of operation of the merchant, such as seasonal or holiday schedules. In addition, in some embodiments hours of operations of various departments of the merchant may also be specified after clicking on the "Advanced" user-selectable control 317.

In section 319 in this example, the merchant specifies the hours in which to contact the merchant, which may be different than the hours the merchant is open. If the merchant does not wanted to be contacted during certain hours (e.g., peak times, or shortly before the merchant closes), the item availability information system may not determine the merchant to be a potential merchant during non-contact hours and/or may only use previously stored results for the merchant during those times. In this example, section 320 allows the merchant to specify a maximum volume of contacts from the item availability information system. In some embodiments, contacts may be aggregated, such that questions from multiple requests for multiple indicated items may be posed in a single contact with the merchant, and the merchant may optionally be allowed to specify that such aggregated contacts not be performed. The merchant may also specify which holidays the merchant observes in section 321 in this example. Although not shown, the merchant may in some embodiments further indicate reduced hours for particular holidays or other days rather than only indicating whether the merchant will be closed or open. The example list of holidays is illustrative, and other holidays or other days may be included or configurable. After selecting the "Save" user-selectable control 309, the merchant's information is stored for later use, and the merchant may optionally be presented with a subsequent user interface as shown in FIG. 3B.

FIG. 3B is an example of a user interface for configuring additional functionality available to merchants and other entities in some embodiments, including to provide pay-per-response advertising to users under specified circumstances. In the illustrated example, in order to use the pay-per-response capabilities, a merchant bids on one or more keywords in section 327, and the item availability information system later presents opportunities to the merchant to provide response information as part of the results for consumer requests that match the keywords, such that the merchant is charged the bid amount for the keywords if the merchant elects to accept the opportunity. In addition, in this illustrated embodiment, FIG. 3B includes an informational section 323, a section 325 for specifying additional text to provide a potential customer (e.g., any awards earned, any guarantees, etc.), a section 329 for specifying whether the merchant will reserve items for interested customers (and if so at what price), a section 331 for specifying types of additional information that the merchant will provide to the item availability information system, a section 333 to specify a logo or photo of the merchant (e.g., to display as part of column 225 of FIG. 2B), and a section 335 to specify one or more promotions or coupons.

Although a merchant may indicate that the merchant will provide price and/or quantity information, the merchant may elect not to provide such information in certain cases. For example, if the merchant is currently holding a sale for the indicated item, the merchant may not desire to specify a current quantity since the item might sell out quickly. As a second example, if the indicated item is on clearance or liquidation, the price may be so low that the merchant cannot provide the price (e.g., by applicable law or by contract with the manufacturer). The merchant may also be allowed to provide more or less information in other embodiments. For example, the merchant may choose to opt-out of the item availability information system so that the merchant will not be contacted in the future. The merchant may also provide additional types of information, such as whether parking is available, whether financing is available (e.g., a layaway plan, a store credit card, or a relationship with a banking for financing), whether there are any guarantees (e.g., price match or a satisfaction guarantee), and the types of payment accepted. The additional information may be made available to the consumer in various manners (e.g., allowing the consumer to search for a merchant where parking is available).

Figure 4:
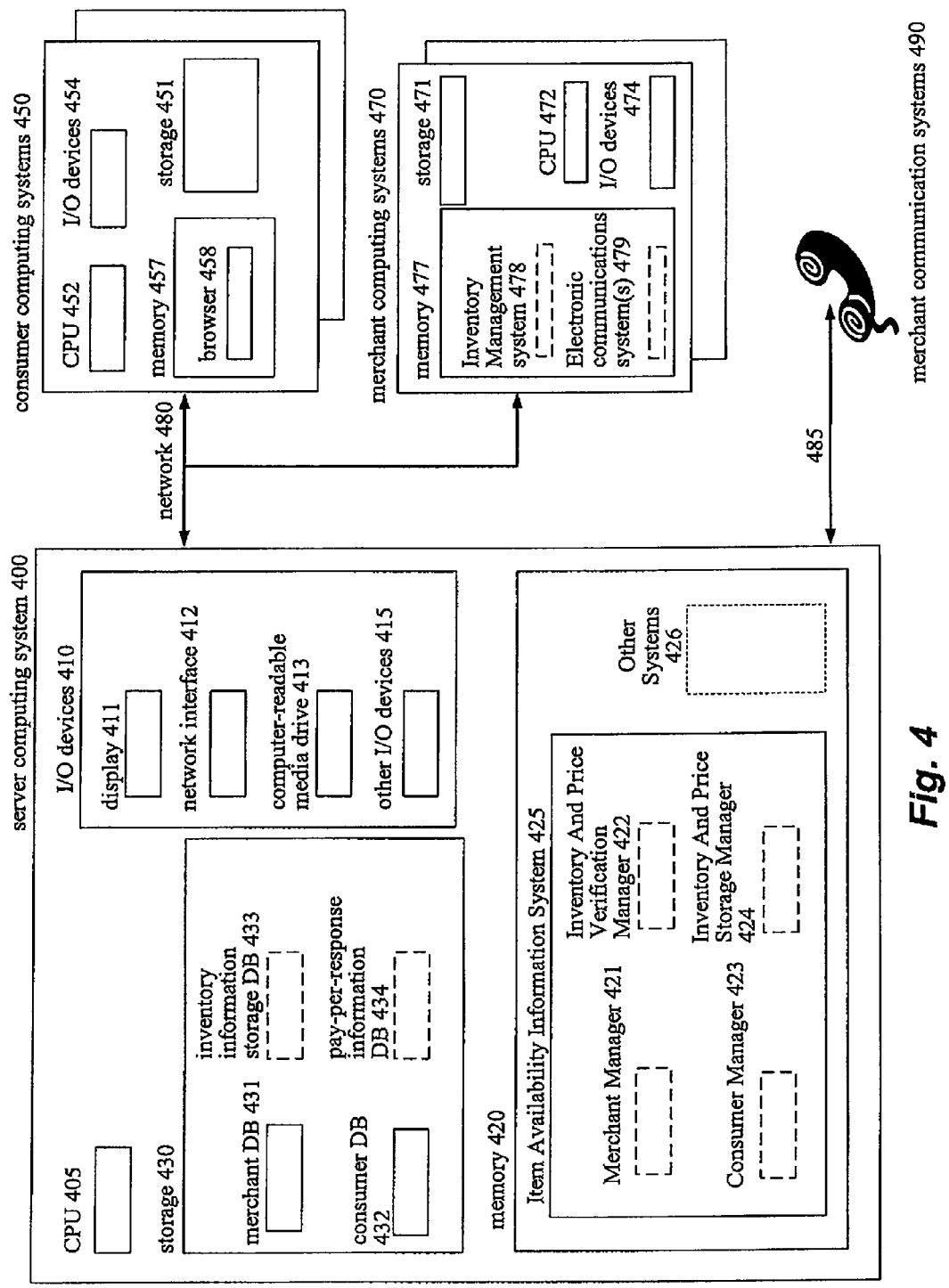
FIG. 4 is a block diagram illustrating a computing system suitable for executing an example embodiment of an item availability information system.

FIG. 4 is a block diagram illustrating a server computing system 400 suitable for executing an example embodiment of an Item Availability Information system, as well as various client consumer computing systems 450 and merchant computing systems 470. In the illustrated embodiment, the server computing system includes a CPU 405, various I/O components 410, storage 430, and memory 420, with the I/O components including a display 411, a network interface 412, a computer-readable media drive 413, and other I/O devices 415.

An embodiment of the Item Availability Information system 425 is executing in the memory 420. The Item Availability Information System interacts with other computing systems over the network 480 (e.g., via the Internet and/or the World Wide Web), and further interacts with merchant communication systems 490 over one or more telephone networks 485 (e.g., the public switched telephone network, one or more cellular telephone networks, using a voice-over-IP system, etc.). Consumers and other users may interact with the Item Availability Information system in order to obtain information about local merchants that are currently available to provide indicated items, such as by each using a browser 458 executing in memory 457 of a client computing system of the user. In some embodiments, such consumers may further establish accounts or otherwise register with the Item Availability Information system in order to provide information about the user for future use, such as a consumer's location, contact information, and preferences. Merchants may similarly interact with the Item Availability Information system in at least some embodiments to establish accounts or otherwise register with the Item Availability Information system, such as by each using a browser (not shown) executing in memory 477 of a client computing system of the merchant, with information provided during the registration including information about items that the merchant carries, contact preferences and information, etc.

The illustrated embodiment of the Item Availability Information system 425 includes several components, including a Merchant Manager component 421, an Inventory And Price Verification Manager component 422, a Consumer Manager component 423, and an optional Inventory And Price Storage Manager 424, although in other embodiments the functionality of the components may instead be organized in other manners. The Consumer Manager component interacts with consumers to receive requests for information about local merchants that are currently available to provide an indicated item, to obtain and store information about the consumer in the consumer database ("DB") data structure 432, and to provide results regarding appropriate local merchants to the consumer. The Merchant Manager component interacts with merchants to register them with the Item Availability Information system, such as to obtain and store information about the merchant in the merchant database ("DB") data structure 431 for later use, and to obtain and store information about pay-per-response advertising for the merchant in the pay-per-response information DB data structure 434. The Inventory And Price Verification Manager component interacts with potential local merchants by contacting at least some of the merchants to determine if the merchants are currently available to provide an indicated item, such as via a telephone or other merchant communication system 490 for the merchant. In embodiments in which the Inventory And Price Storage Manager component is used, the component may store information about item availability and pricing information obtained from merchants in the inventory information storage DB data structure 433, such as for a temporary time so that the information may be used for other requests.

In addition, to the Item Availability Information system, the computing system 400 may also optionally execute one or more other systems 426, such as to provide additional capabilities related to the Item Availability Information system, to provide a Web store, etc.

It will be appreciated that the illustrated computing systems are merely illustrative and are not intended to limit the scope of the present invention. The server computing system 400 may instead be comprised of multiple interacting computing systems or devices, and may be connected to other devices that are not illustrated, including through one or more networks such as the Internet, the Web, or the public switched telephone network. More generally, the various computing systems may each comprise any combination of hardware and software that can interact in the manners described, including (without limitation) desktop or other computers, network devices, internet appliances, PDAs ("Personal Digital Assistants"), cellphones, wireless phones, devices with walkie-talkie and other push-to-talk capabilities, pagers, electronic organizers, television-based systems (e.g., using set-top boxes and/or personal/digital video recorders), and other various consumer products that include inter-communication capabilities. In addition, the functionality provided by the Item Availability Information system components may in some embodiments be combined in fewer components or distributed in additional components. Similarly, in some embodiments the functionalities of some of the illustrated components may not be provided and/or other additional functionality may be available.

It will also be appreciated that, while various items are illustrated as being stored in memory or on storage while being used, these items or portions of them can be transferred between memory and other storage devices for purposes of memory management and data integrity, and that these elements or portions of them may in other embodiments be stored in other memory and/or other storage devices, including ones not shown in this example embodiment. Alternatively, in other embodiments some or all of the software components may execute in memory on another device and communicate with an illustrated computing system or device via inter-computer communication. Some or all of the item availability information system components or data structures may also be stored (e.g., as instructions or structured data) on a computer-readable medium, such as a hard disk, a memory, a network, or a portable media article (e.g., a DVD or flash memory device) to be read by an appropriate drive. The item availability information system components and data structures may also be transmitted as contents of generated data signals (e.g. by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 5:
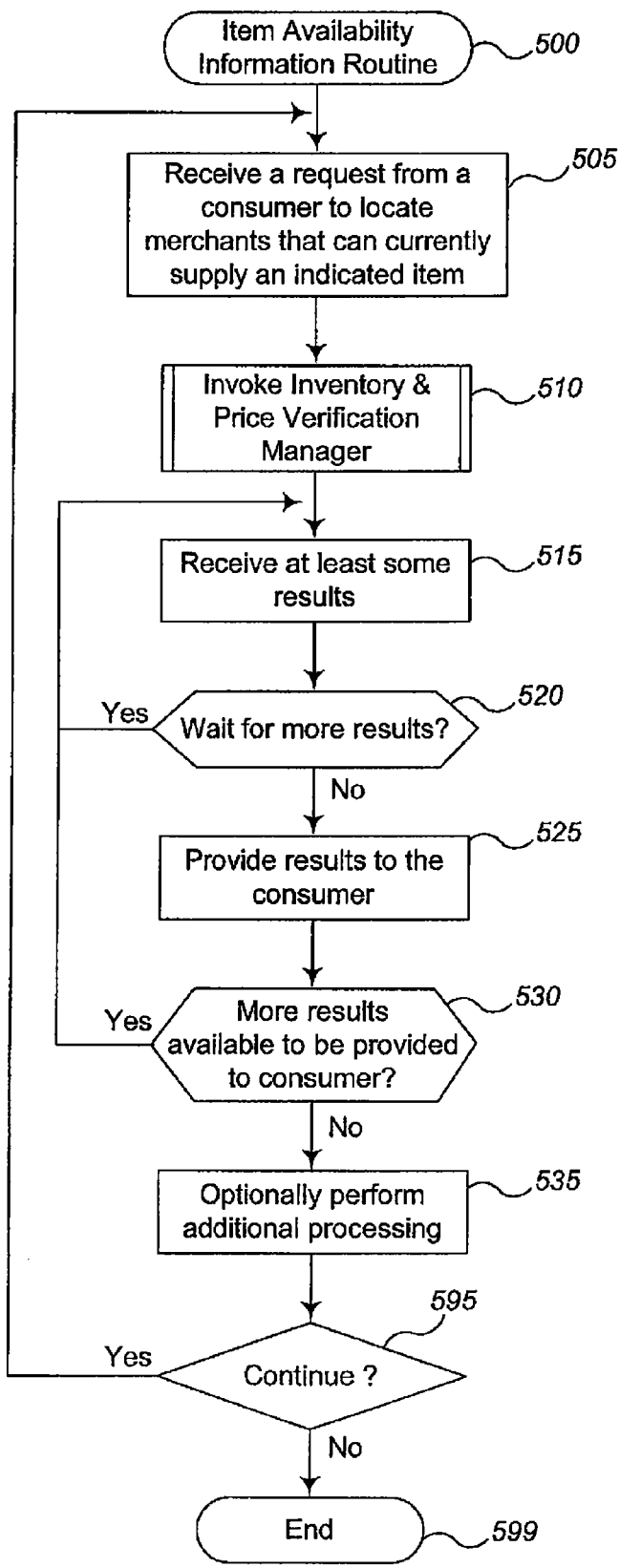
FIG. 5 is a flow diagram of an example embodiment of an Item Availability Information routine.

FIG. 5 is a flow diagram of an example embodiment of the Item Availability Information routine 500. The routine may, for example, be provided by execution of the Item Availability Information system 425 of FIG. 4, such as to provide an item availability information service to consumers and other users.

The routine begins at step 505, where a request is received from a consumer to identify one or more local merchants that are currently available to provide an indicated item. After receiving the request, the routine proceeds to step 510, where the Inventory And Price Verification Manager subroutine is executed. The routine then continues to step 515, where at least some results are received. After receiving at least some results, the routine proceeds to step 520, where the routine determines whether to wait for more results. If so, the routine returns to step 515, and if not proceeds to step 525 to provide the currently available results to the consumer. After step 525, the routine continues to step 530 to determine if more results are available to be provided to the consumer. If so, the routine returns to step 515, and if not proceeds to step 535 to optionally perform additional processing. The additional processing may, for example, include reserving the item on behalf of the consumer or providing additional information to the consumer (e.g., hours of the merchant's operation, driving directions to the merchant, indications of any specials regarding the indicated item from a merchant, etc.). The additional processing may also include storing the results for potential later use, such as to provide faster results to later consumers searching for the same indicated item in the same geographical area. The routine then proceeds to step 595, where it determines whether to continue. If so, the routine returns to step 505, and if not ends at step 599.

Figure 6:
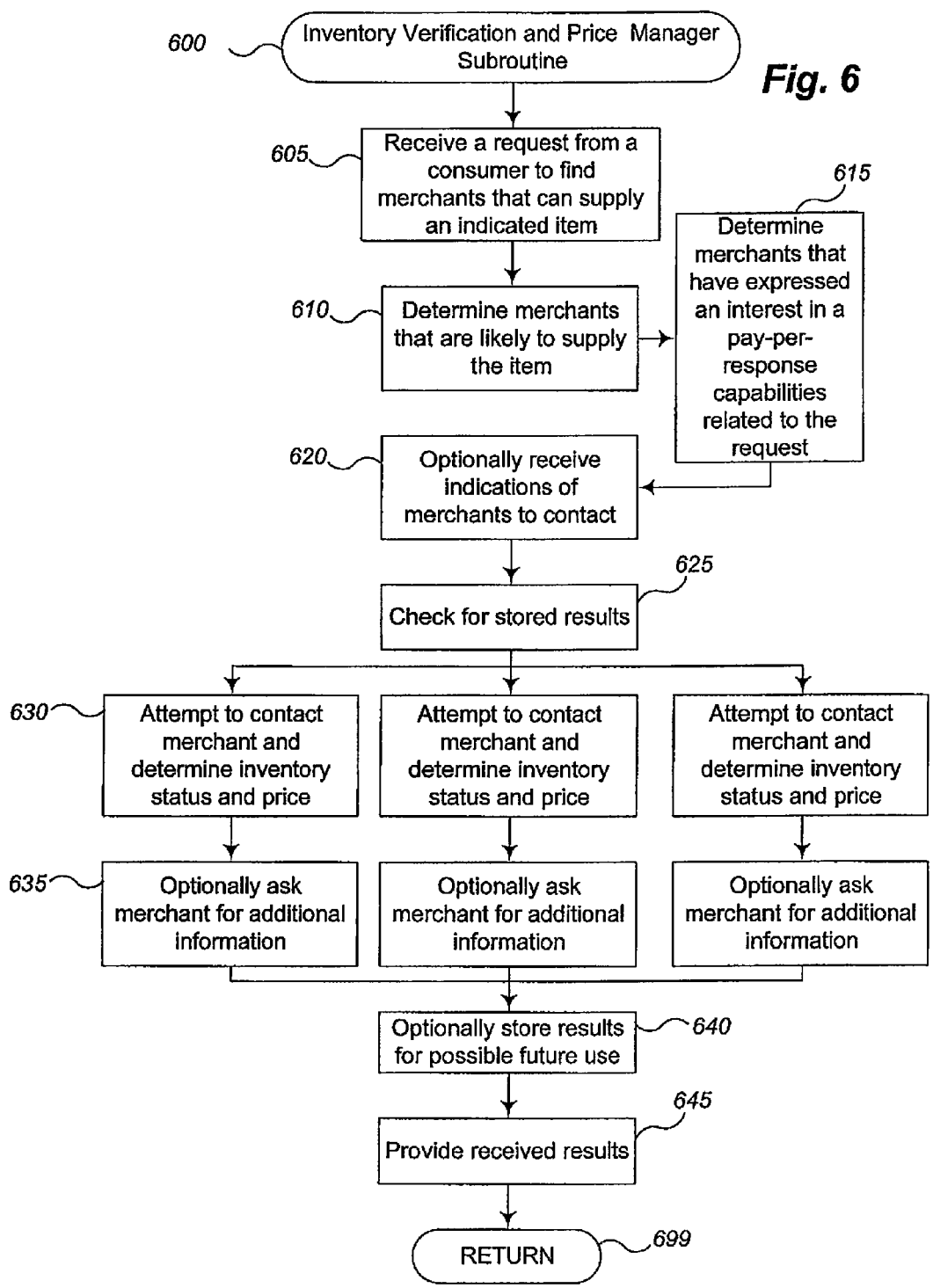
FIG. 6 is a flow diagram of an example embodiment of an Inventory And Price Verification Manager subroutine.

FIG. 6 is a flow diagram of an example embodiment of the Inventory And Price Verification Manager subroutine 600. The subroutine may, for example, be provided by execution of the Inventory And Price Verification Manager component 422 of FIG. 4, such as to interact with potentially appropriate merchants to determine one or more merchants that are currently available to provide an indicated item. Invocation of the subroutine may occur, for instance, at step 510 of FIG. 5.

The subroutine begins at 605, where an indication is received of a request from a consumer to identify local merchants that are currently available to provide an indicated item. In step 610, the subroutine determines potential merchants that may be able to currently provide the indicated item, such as based on those merchants being known to typically carry the indicated item in inventory. The subroutine then proceeds to step 615 in the illustrated embodiment, where it determines any merchants that have expressed an interest in pay-per-response advertising capabilities related to the request. The subroutine then continues to step 620, where the subroutine may optionally receive indications from the consumer of potential merchants selected to be contacted, such as after providing information to the consumer to indicate potential merchants. The subroutine then proceeds to step 625, where previously stored (or "cached") results (if any) may be checked for previously received results that are relevant for the request and still valid (e.g., received within a predetermined or user-specified time limit or other prior time period).

In the illustrated embodiment, multiple potential merchants are then contacted simultaneously by the subroutine, although in other embodiments they may instead by contacted in series (whether in a synchronous or asynchronous manner). In the illustrated embodiment, the subroutine proceeds to perform steps 630 and 635 in parallel for each potential merchant to be contacted (e.g., in separate threads or processes, or on different computing systems)—an example of three parallel processes in shown in FIG. 6 for illustrative purposes. In particular, in each step 630, one of the selected potential merchants is contacted in order to obtain information to determine current inventory of the merchant for the indicated item, and in step 635 optionally asks for additional information from the merchant. The contacting of at least some of the merchants may include automatically calling those merchants (e.g., by using an IVR system to ask a human representative of the merchant to respond to one or more questions). An exemplary conversation is illustrated below:

Item Availability Information System: Hello, this is Item Availability Information System calling on behalf of a potential customer. Do you have *The Chronicles of Narnia* in paperback by C. S. Lewis in stock? Please say "yes", "no", or "wait while I'm checking".

Merchant: No.

If the merchant's response was instead positive to having the indicated item in stock, the merchant may be subsequently asked for the price of the indicated item and/or for a variety of types of other additional information. The merchant may additionally that the merchant will not currently provide the requested information and/or is not to be contacted by the system in the future.

The conversation may also continue to learn more about the merchant if the response is negative. For example:

Item Availability Information System: Do you carry any children's books?

Merchant: No.

Questions, including follow-up questions, may similarly be performed using other methods of contacting the merchant in other embodiments.

In step 640, the results provided by the merchants are received, such as in an incremental manner as the various merchants provide responses, and then are optionally stored for potential future use. In step 645, the subroutine then provides the received results (e.g., by returning the results for use in step 515 of FIG. 5), and then continues to step 699 and ends.

Although not shown for the sake of clarity, various error flows may also occur as part of the Inventory & price verification manager subroutine. For example, if the merchant is contacted and there is no answer, the subroutine may indicate that it is unable to contact the merchant, or alternatively may in some embodiments reattempt to contact the merchant for a predetermined period of time (e.g., 5 minutes) or a predetermined number of attempts (e.g., 3). In some embodiments, a merchant may be contacted using other methods of contact if one method of contact does not result in a response. Similarly, if the merchant is contacted, but the merchant does not respond or hangs up, the results may also indicate the merchant is unable to be contacted.

Figure 7:
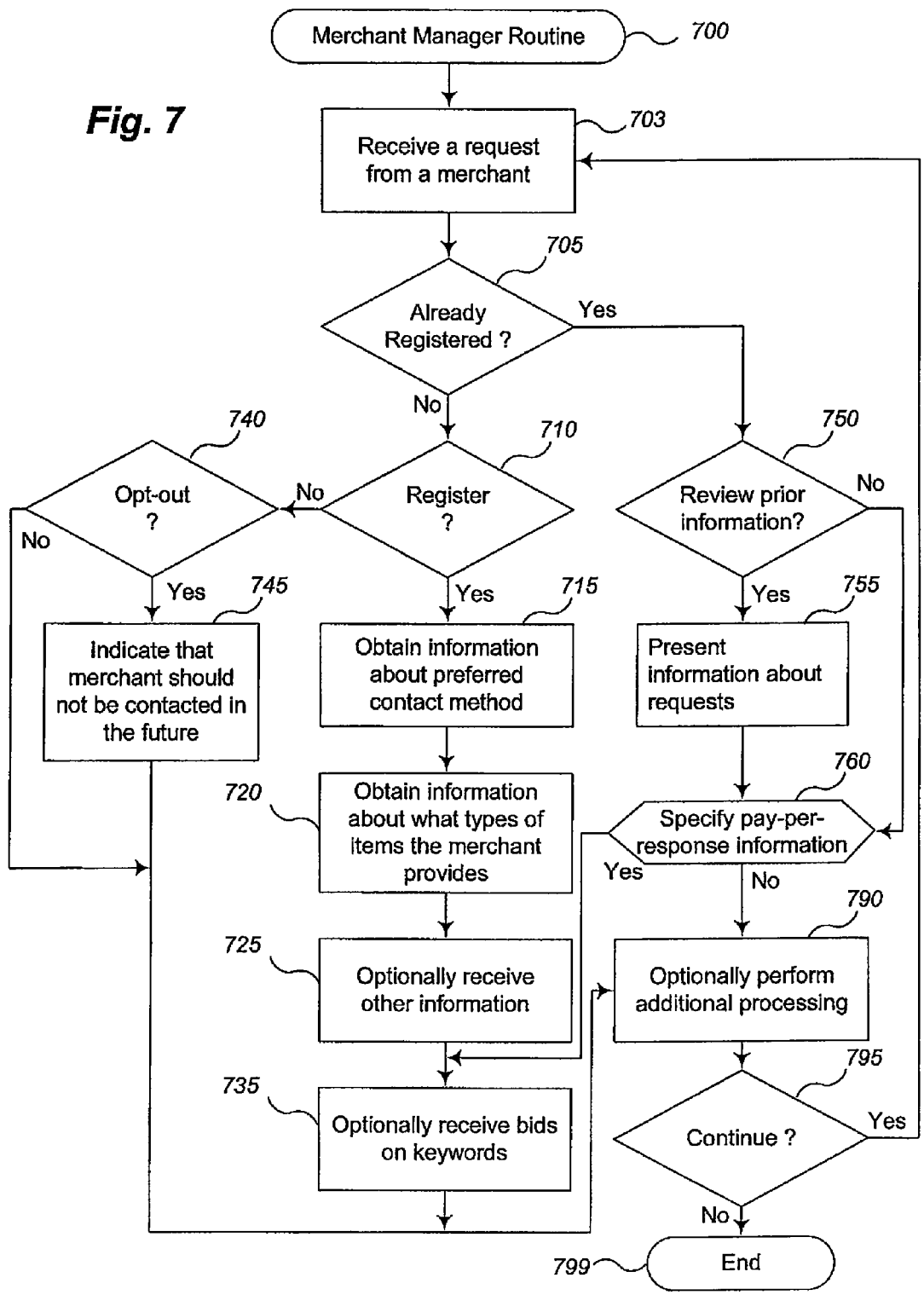
FIG. 7 is a flow diagram of an example embodiment of a Merchant Manager routine.

FIG. 7 is a flow diagram of an example embodiment of a Merchant Manager routine 700. The routine may, for example, be provided by execution of the Merchant Manager component 421 of FIG. 4, such as to interact with merchants to receive information about the merchant and to customize future interactions with the merchant.

The routine begins at step 703, where a request form a merchant is received. After receiving the request, the routine proceeds to 705, where the routine determines if the merchant is already registered. If so, the routine proceeds to step 750, and if not proceeds to step 710. At step 710, the routine determines if the merchant wants to register with the Item Availability Information system, and if so proceeds to step 715, and if not proceeds to step 740. In step 715, the routine obtains information about one or more preferred contact methods for the merchant, including the contact information to be used for those preferred method(s). After step 715, the routine continues to step 720 to obtain information about types of items that the merchant provides, and then proceeds to step 725 to optionally obtain other information about the merchant. In step 735, the routine optionally receives one or more bids and keywords from the merchant for use with pay-per-response capabilities provided by the system. The routine then proceeds to step 790 to optionally perform additional processing, such as to store the received information about the merchant for later use.

If it is instead determined in step 710 that an unregistered merchant does not want to register with the item availability information system, the routine proceeds to step 740 to determine whether the received request is to opt-out of future interactions with the item availability information system. If so, the routine stores corresponding information in step 745 so that the merchant will not be contacted in the future. After step 745, or if the merchant does not want to opt-out, the routine proceeds to step 790 to optionally perform additional processing, such as to respond to another type of request as appropriate.

If it was determined in step 705 that the merchant has registered previously, the routine determines in step 750 if the request was to review prior requests for information. If so, the routine proceeds to step 755, where the routine presents information to the merchant about prior information requests. If not, or after step 755, the routine proceeds to step 760 to determine if the registered merchant wants to specify pay-per-response information. If so, the routine proceeds to step 735, and if not continues to 790. After step 790, the routine continues to step 795 to determine whether to continue. If so, the routine returns to step 703, and if not ends at step 799.

Figure 8:
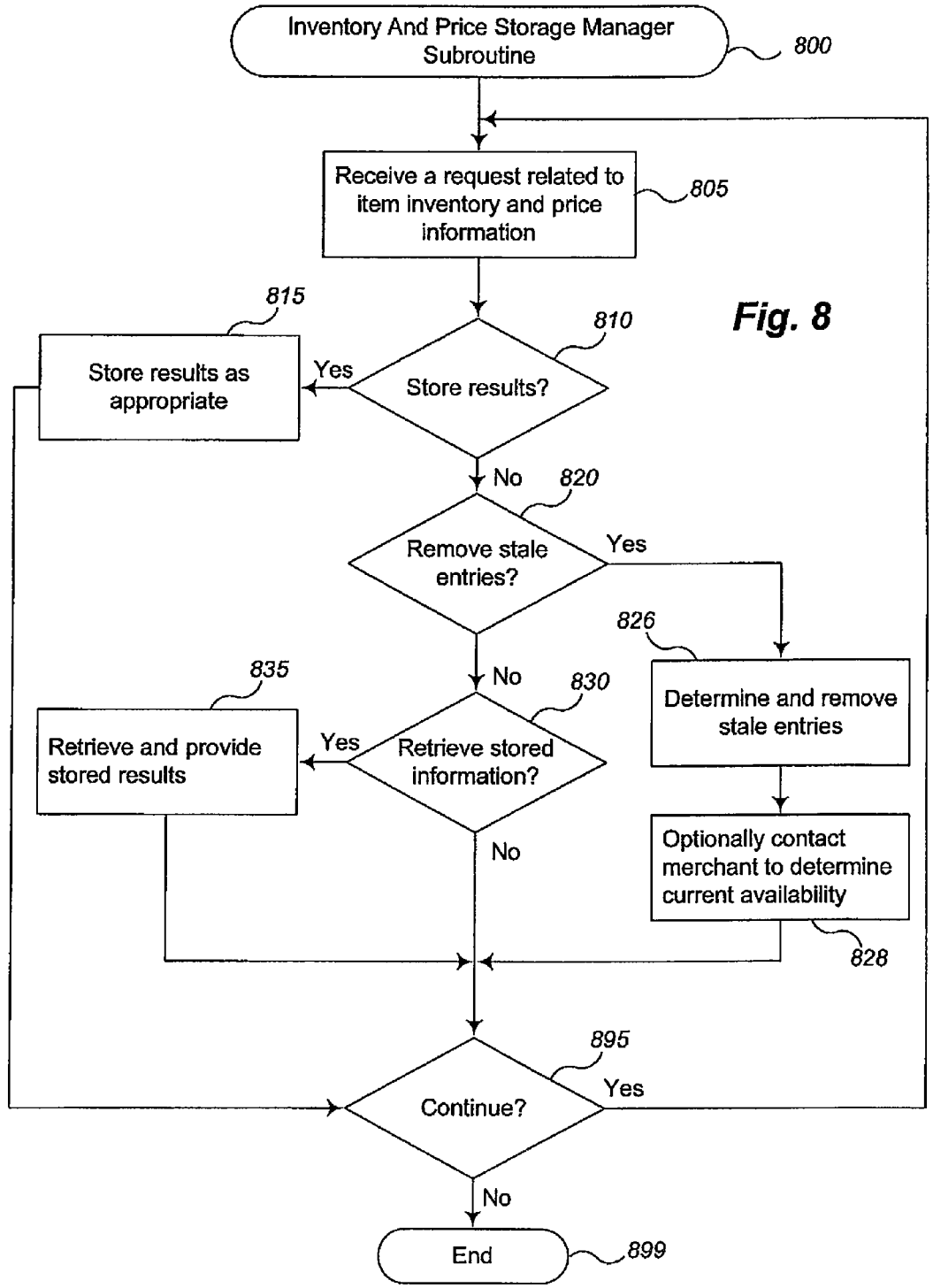
FIG. 8 is a flow diagram of an example embodiment of an Inventory And Price Cache Manager routine.

FIG. 8 is a flow diagram of an example embodiment of the Inventory And Price Information Storage Manager subroutine 800. The subroutine may, for example, be provided by the execution of the Inventory And Price Storage Manager component 424 of FIG. 4, such as to store received results temporarily for possible future use. The subroutine may be invoked, for example, at step 640 of FIG. 6.

The subroutine begins at step 805, where a request is received related to item inventory and/or price information. The request may be received from another component, such as the Inventory And Price Verification Manager component, or alternatively may be generated periodically (e.g., to review stored entries and potentially remove information that is not sufficiently recent). Depending on the type of the request, the request may also contain various parameters, such as particular results information to be stored, or an indicated item to determine if relevant results for the item are stored. After the request is received, the subroutine proceeds to step 810, where it determines if the request was to store results of a previous search. If so, the subroutine proceeds to step 815 to store the results as appropriate, such as in a temporary manner in the inventory information storage DB 433 of FIG. 4. After storing the results as appropriate, the subroutine proceeds to step 895.

If the request was not to store the inventory results, however, then the subroutine proceeds to step 820 to determine if the request was to identify remove previously stored results that are not longer sufficiently recent (or that are "stale"). If so, the subroutine proceeds to step 826 to determine and remove stale entries. The length of time until the results become stale may depend on various factors, such as the length of time since the results were determined, the popularity of the item, the type of item (e.g., whether the item is seasonal or perishable), any promotions associated with the item, or the time of year or day (e.g., to check more often around the Christmas holidays, or less in the middle of the night when less purchases generally taking place). After removing entries, the subroutine may in step 828 optionally re-contact the merchant whose results were removed to determine current availability information and to store any new obtained results. After optionally re-contacting the merchants, the subroutine proceeds to step 895.

If it is instead determined in step 820 that the request is not to remove stale entries, the subroutine proceeds to step 830 to determine if the request is to retrieve previously stored information for current use. If so, the subroutine proceeds to step 835 to retrieve and provide any relevant stored results that are not stale. After step 835, the subroutine proceeds to step 895. At step 895, the subroutine determines whether to continue. If so, the subroutine returns to step 805, and if not ends at step 899.

While the item availability information system is in some embodiments used to identify local merchants, including those without Internet Web sites and/or e-commerce capabilities, in other embodiments the item availability information system may be used to identify other types of merchants (including non-local merchants and e-commerce merchants), whether instead of or in addition to local merchants. In addition, in some embodiments a single item availability information system may support consumers and other users in multiple geographic areas (e.g., an entire state, country, or group of countries), while in other embodiments some or all geographic areas may have a distinct item availability information system specific to that area.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for an item availability information service to identify merchants local to a consumer that are currently able to provide an indicated item to the consumer, the method comprising:

receiving a request from a consumer for information about one or more merchants that are geographically local to the consumer and currently available to provide an indicated item from current local inventory of the merchant;

automatically determining at least one geographically local merchant that is currently available to provide the indicated item to the consumer from the current local inventory of the merchant, the automatic determining being performed by one or more programmed computing systems of the item availability information service and including:

automatically identifying one or more merchants geographically local to the consumer that at least potentially provide the indicated item by:

determining a location of the consumer and a type of the indicated item; and determining merchants near the determined location of the consumer that are each likely to provide items of the determined type based at least in part on one or more of a name of the merchant, a category of merchants to which the merchant belongs, and a group to which the merchant belongs; and automatically contacting a human representative of each of at least one of the identified merchants to query if the merchant is currently available to provide the indicated item from the current local inventory of the merchant and to query for a current price of the indicated item from the merchant; and providing information to the consumer to indicate one or more of the determined at least one geographically local merchants and to indicate the current price for the indicated item for each of the indicated one or more merchants.

2. The method of claim 1 wherein the determining of the at least one geographically local merchant includes, after the identifying of the one or more geographically local merchants that at least potentially provide the indicated item:

presenting information about the identified one or more geographically local merchants to the consumer; and receiving one or more indications from the consumer of one or more of the presented merchants that the consumer has selected to be queried;

and wherein the at least one identified merchants whose human representatives are contacted include the one or more selected merchants.

3. The method of claim 1 wherein the automatic contacting of the human representative of each of the at least one identified merchants is performed by telephoning the human representative and using automated interactive voice recognition capabilities to interact with the human representative.

4. The method of claim 1 wherein the received request includes one or more questions supplied by the consumer, wherein the automatic contacting of the human representative of each of the at least one identified merchants is performed in response to the received request from the consumer and includes obtaining responses from the human representative to the one or more questions, and wherein the providing of the information to the consumer includes providing one or more of the obtained responses to the consumer.

5. The method of claim 1 wherein the automatic determining of the at least one geographically local merchant that is currently available to provide the indicated item to the consumer includes determining merchants whose business hours include one or more determined periods of time subsequent to a current time.

6. The method of claim 1 wherein the automatic determining of the at least one geographically local merchant that is currently available to provide the indicated item to the consumer includes determining one or more merchants who have the indicated item and are willing to provide the indicated item to the consumer.

7. The method of claim 1 wherein the automatic determining of the at least one geographically local merchant that is currently available to provide the indicated item to the consumer and the providing of the information to the consumer is performed for each of multiple requests from multiple consumers and in a substantially real-time manner after each of the requests are received.

8. The method of claim 1 wherein the automatic identifying of the one or more merchants includes accessing a public source of information that, for each of the one or more merchants, provides information about at least one category of items available from the merchant.

9. The method of claim 1 wherein the automatic identifying of the one or more merchants includes accessing yellow pages information to, for each of the one or more merchants, identify at least one category of items available from the merchant.

10. A computer-implemented method for an item availability information service to identify merchants local to a consumer that are currently able to provide an indicated item to the consumer, the method comprising:

receiving a request from a consumer for information about one or more merchants that are geographically local to the consumer and currently available to provide an indicated item from current local inventory of the merchant;

automatically determining at least one geographically local merchant that is currently available to provide the indicated item to the consumer from the current local inventory of the merchant, the automatic determining being performed by one or more programmed computing systems of the item availability information service and including:

automatically identifying one or more merchants geographically local to the consumer that at least potentially provide the indicated item, wherein the identifying of the one or more geographically local merchants that at least potentially provide the indicated item is based on information obtained from human representatives of merchants near the consumer regarding types of items that the merchants have selected to include in inventory; and for each of at least one of the identified merchants, automatically contacting a human representative of the merchant to query (i) if the merchant is currently available to provide the indicated item from the current local inventory of the merchant, (ii) for a current price of the indicated item, and (iii) if the merchant currently has one or more copies of the indicated item in inventory; and providing information to the consumer to indicate one or more of the determined at least one geographically local merchants and to indicate the current price for the indicated item for each of the indicated one or more merchants.

11. A computer-implemented method for determining local merchants having current availability to provide an indicated item, the method comprising:

receiving a request from each of one or more advertising merchants to provide information to users whose requests match specified criteria, such that the advertising merchant will pay an indicated fee in exchange for providing the information;

receiving a request from a user to identify one or more local merchants that have an indicated item in current inventory;

determining that the received request from the user matches the criteria specified by each of at least one of the advertising merchants;

providing an opportunity to one or more of the at least one advertising merchants to provide information to the user in response to the received request from the user;

determining at least one local merchant that has the indicated item in current inventory by, for each of one or more local merchants that potentially may have the indicated item in current inventory of the merchant, automatically contacting a human representative of the merchant to query if the merchant has the indicated item in the current inventory of the merchant, the automatic contacting of the human representative being initiated by a programmed computing system;

providing information to the user to indicate one or more of the at least one determined merchants that have the indicated item in current inventory, the providing of the information to the user including, after at least one of the one or more advertising merchants elects to accept the provided opportunity, including information from each of the at least one advertising merchants in the information provided to the user; and obtaining from each of the at least one advertising merchants the indicated fee for that advertising merchant.

12. A computer-implemented method for determining local merchants having current availability to provide an indicated item, the method comprising:

receiving a request from a user to identify one or more local merchants that have an indicated item in current inventory;

determining at least one local merchant that has the indicated item in current inventory by, for each of one or more local merchants that potentially may have the indicated item in current inventory of the merchant, automatically contacting a human representative of the merchant to query if the merchant has the indicated item in the current inventory of the merchant, the automatic contacting of the human representative being initiated by a programmed computing system, and wherein the determining of the at least one local merchants that has the indicated item in current inventory further includes, for each of one or more other local merchants that are distinct from the one or more local merchants that potentially may have the indicated item in current inventory of the merchant, selecting the other local merchant as one of the determined local merchants that has the indicated item in current inventory, the selecting being based on information previously obtained from contacting a human representative of the other local merchant on behalf of another user, and wherein, for at least one of the one or more other local merchants, the previously obtained information was obtained for the indicated item in response to a request from another user for the indicated item; and providing information to the user to indicate one or more of the at least one determined merchants that have the indicated item in current inventory.

13. The method of claim 12 wherein the querying of a human representative of a merchant includes obtaining current pricing information for the indicated item from the merchant, and wherein the providing of information to the user includes providing to the user the obtained current pricing information for at least one merchant.

14. The method of claim 12 wherein the querying of a human representative of a merchant includes obtaining quantity information for current in-stock copies of the indicated item at the merchant, and wherein the providing of information to the user includes providing to the user the obtained in-stock copy quantity information for at least one merchant.

15. The method of claim 12 wherein the querying of a human representative of a merchant includes determining if the indicated item is currently available for a substantially immediate retrieval by the user from the merchant, and wherein the providing of information to the user includes indicating to the user the current availability for substantially immediate retrieval for at least one merchant.

16. The method of claim 12 wherein the received request further includes one or more indications of one or more questions specified by the user, wherein the querying of a human representative of a merchant includes obtaining answers from the human representative to the specified questions, and wherein the providing of information to the user includes providing to the user the obtained answers to the user-specified questions.

17. The method of claim 12 wherein the automatic contacting of the human representative of at least one merchant to query if the merchant has the indicated item in the current inventory of the merchant is performed by telephoning the human representative and using automated interactive voice recognition.

18. The method of claim 12 wherein the automatic contacting of the human representative of at least one merchant to query if the merchant has the indicated item in the current inventory of the merchant is performed using one or more of email, instant messaging, and SMS messages.

19. The method of claim 12 wherein the automatic contacting of the human representative of at least one merchant to query if the merchant has the indicated item in the current inventory of the merchant is performed in a manner previously specified for the merchant during prior interactions with a human representative of the merchant that occurred as part of a prior automated contacting of that human representative.

20. The method of claim 12 further comprising, after identifying the one or more local merchants, registering one of the identified one or more local merchants, the registering of the one merchant including obtaining information from the one merchant about a preferred method of contacting the one merchant, and wherein the automatic contacting of the human representative of the one merchant is performed in the preferred method for the one merchant.

21. The method of claim 12 further comprising, after identifying the one or more local merchants, registering one of the identified one or more local merchants, the registering of the one merchant including obtaining information about items that the one merchant carries in inventory of the one merchant.

22. The method of claim 12 wherein the automatic contacting of the human representative of at least one merchant to query if the merchant has the indicated item in the current inventory of the merchant includes obtaining information from the human representative about other items that the merchant carries in inventory, and wherein the determining of the at least one local merchant that has the indicated item in current inventory includes automatically identifying the one or more local merchants that potentially may have the indicated item in the current inventory based at least in part on the obtained information.

23. The method of claim 12 wherein the indicated item has a type, and wherein the determining of the at least one local merchant that has the indicated item in current inventory includes automatically identifying the one or more local merchants that potentially may have the indicated item in the current inventory based at least in part on the type of the indicated item.

24. The method of claim 12 wherein the indicated item is a mass produced product having numerous copies.

25. The method of claim 12 wherein identifying of each of the one or more local merchants includes at least one of using yellow page listing information for the merchant, analyzing information from a Web site of the merchant, and obtaining responses from humans who answer questions about the merchant.

26. The method of claim 12 wherein the received request includes an indication of one or more times, and wherein the determining of the at least one local merchant that has the indicated item in current inventory includes determining that the at least one merchant is able to provide the indicated item at or before at least one of the indicated times.

27. The method of claim 12 wherein the determining of the at least one local merchant that has the indicated item in current inventory includes providing information to the user regarding at least one local merchant that potentially may have the indicated item in current inventory, and receiving one or more indications from the user of one or more selected merchants from the indicated merchants presented to the user, and wherein the one or more local merchants whose human representatives are contacted include the selected merchants.

28. The method of claim 27 wherein the providing of the information to the user regarding each of the at least one local merchants includes providing information indicating at least one of a distance between the user and the merchant, a location of the merchant, hours of operations of the merchant, and user ratings of the merchant.

29. The method of claim 12 wherein multiple of the at least one determined merchants have the indicated item in current inventory, and wherein the providing of the information to the user to indicate the at least one determined merchants that have the indicated item in current inventory includes incrementally providing information about a subset of the multiple merchants who are determined to have the indicated item in current inventory, and later providing information about other of the multiple merchants who are later determined to have the indicated item in current inventory.

30. The method of claim 12 wherein the providing of the information to the user is performed via at least one of email, one or more Web pages, one or more telephone calls, text messaging, and instant messaging.

31. The method of claim 12 wherein the determining of the at least one local merchants that has the indicated item in current inventory further includes, for each of one or more other local merchants that are distinct from the one or more local merchants that potentially may have the indicated item in current inventory of the merchant, selecting the other local merchant as one of the determined local merchants that has the indicated item in current inventory, the selecting being based on information previously obtained from contacting a human representative of the other local merchant on behalf of another user.

32. The method of claim 31 wherein the one or more determined merchants indicated in the information provided to the user includes at least one of the one or more other local merchants, and wherein the providing of the information to the user includes, for each of the at least one other local merchants, providing at least some of the information previously obtained from contacting the human representative of the other local merchant.

33. The method of claim 12 further comprising, after the determining of one of the local merchants that has the indicated item in current inventory, reserving the indicated item at the one local merchant for retrieval by the user at a location of the merchant based on one or more of an indication received from the user, a previously specified preference of the user, and a fee obtained from the user.

34. The method of claim 12 wherein the programmed computing system is part of an item availability information service that receives and responds to requests from each of multiple users, and wherein the item availability information service is unaffiliated with the users and the merchants.

35. The method of claim 12 wherein the determining of the at least one local merchant that has the indicated item in current inventory includes identifying merchants as being local if the merchants are at least one of within a distance threshold from a location of the user and within a government-defined geographical boundary.

36. The method of claim 12 wherein the determining of the at least one local merchant that has the indicated item in current inventory and the providing of the information to the user is performed in a substantially real-time manner after the receiving of the request.

37. A computer-implemented method for determining local merchants having current availability to provide an indicated item, the method comprising:

receiving a request from a user to identify one or more local merchants that have an indicated item in current inventory;

determining at least one local merchant that has the indicated item in current inventory by, for each of one or more local merchants that potentially may have the indicated item in current inventory of the merchant, automatically contacting a human representative of the merchant to query if the merchant has the indicated item in the current inventory of the merchant, the automatic contacting of the human representative being initiated by a programmed computing system, and wherein the determining of the at least one local merchants that has the indicated item in current inventory further includes, for each of one or more other local merchants that are distinct from the one or more local merchants that potentially may have the indicated item in current inventory of the merchant, selecting the other local merchant as one of the determined local merchants that has the indicated item in current inventory, the selecting being based on information previously obtained from contacting a human representative of the other local merchant on behalf of another user, and wherein the selecting of an other local merchant as one of the determined local merchants that has the indicated item in current inventory is performed only if the information previously obtained from contacting the human representative of the other local merchant on behalf of the another user was obtained within a specified prior period of time; and providing information to the user to indicate one or more of the at least one determined merchants that have the indicated item in current inventory.

38. A non-transitory computer-readable medium whose contents program a computing device of an item availability information service to identify merchants local to a consumer that are currently able to provide an indicated item to the consumer, by performing a method comprising:
receiving a request from a consumer for information about one or more merchants that are geographically local to the consumer and currently available to provide an indicated item from current local inventory of the merchant;
automatically determining at least one geographically local merchant that is currently available to provide the indicated item to the consumer from the current local inventory of the merchant, the automatic determining being performed by the programmed computing device of the item availability information service and including:
automatically identifying one or more merchants geographically local to the consumer that at least potentially provide the indicated item by:
determining a location of the consumer and a type of the indicated item; and
determining merchants near the determined location of the consumer that are each likely to provide items of the determined type based at least in part on one or more of a name of the merchant, a category of merchants to which the merchant belongs, and a group to which the merchant belongs; and
automatically contacting a human representative of each of at least one of the identified merchants to query if the merchant is currently available to provide the indicated item from the current local inventory of the merchant and to query for a current price of the indicated item from the merchant; and
providing information to the consumer to indicate one or more of the determined at least one geographically local merchants and to indicate the current price for the indicated item for each of the indicated one or more merchants.

39. The non-transitory computer-readable medium of claim 38 wherein the determining of the at least one geographically local merchant includes, after the identifying of the one or more geographically local merchants that at least potentially provide the indicated item:
presenting information about the identified one or more geographically local merchants to the consumer; and
receiving one or more indications from the consumer of one or more of the presented merchants that the consumer has selected to be queried;
and wherein the at least one identified merchants whose human representatives are contacted include the one or more selected merchants.

40. The non-transitory computer-readable medium of claim 38 wherein the automatic identifying of the one or more merchants includes accessing yellow pages information to, for each of the one or more merchants, identify at least one category of items available from the merchant, and wherein the automatic contacting of the human representative of each of the at least one identified merchants is performed by telephoning the human representative and using automated interactive voice recognition capabilities to interact with the human representative.

41. The non-transitory computer-readable medium of claim 38 wherein the computer-readable medium is a memory of the configured computing device, and wherein the contents are instructions that when executed program the configured computing device to perform the method.

42. A computing system of an item availability information service that is programmed to identify merchants local to a consumer that are currently able to provide an indicated item to the consumer, comprising:
one or more processors;
one or more modules configured to, when executed by at least one of the one or more processors:
receive a request from a consumer for information about one or more merchants that are geographically local to the consumer and currently available to provide an indicated item from current local inventory of the merchant;
automatically determine at least one geographically local merchant that is currently available to provide the indicated item to the consumer from the current local inventory of the merchant, the automatic determining including:
automatically identifying one or more merchants geographically local to the consumer that at least potentially provide the indicated item by:
determining a location of the consumer and a type of the indicated item; and
determining merchants near the determined location of the consumer that are each likely to provide items of the determined type based at least in part on one or more of a name of the merchant, a category of merchants to which the merchant belongs, and a group to which the merchant belongs; and
automatically contacting a human representative of each of at least one of the identified merchants to query if the merchant is currently available to provide the indicated item from the current local inventory of the merchant and to query for a current price of the indicated item from the merchant; and
provide information to the consumer to indicate one or more of the determined at least one geographically local merchants and to indicate the current price for the indicated item for each of the indicated one or more merchants.

43. The computing system of claim 42 wherein the determining of the at least one geographically local merchant includes, after the identifying of the one or more geographically local merchants that at least potentially provide the indicated item:
presenting information about the identified one or more geographically local merchants to the consumer; and
receiving one or more indications from the consumer of one or more of the presented merchants that the consumer has selected to be queried;
and wherein the at least one identified merchants whose human representatives are contacted include the one or more selected merchants.

44. The computing system of claim 42 wherein the automatic identifying of the one or more merchants includes accessing yellow pages information to, for each of the one or more merchants, identify at least one category of items available from the merchant, wherein the automatic contacting of the human representative of each of the at least one identified merchants is performed by telephoning the human representative and using automated interactive voice recognition capabilities to interact with the human representative, and wherein the one or more modules each includes software instructions for execution by the at least one processors of the computing system.

45. A non-transitory computer-readable medium whose contents program a computing device to determine local merchants having current availability to provide an indicated item, by performing a method comprising:
receiving a request from a user to identify one or more local merchants that have an indicated item in current inventory;
determining at least one local merchant that has the indicated item in current inventory by, for each of one or more local merchants that potentially may have the indicated item in current inventory of the merchant, automatically contacting a human representative of the merchant to query if the merchant has the indicated item in the current inventory of the merchant, the automatic contacting of the human representative being initiated by the programmed computing device, and wherein the determining of the at least one local merchants that has the indicated item in current inventory further includes, for each of one or more other local merchants that are distinct from the one or more local merchants that potentially may have the indicated item in current inventory of the merchant, selecting the other local merchant as one of the determined local merchants that has the indicated item in current inventory, the selecting being based on information previously obtained from contacting a human representative of the other local merchant on behalf of another user, and wherein, for at least one of the one or more other local merchants, the previously obtained information was obtained for the indicated item in response to a request from another user for the indicated item; and
providing information to the user to indicate one or more of the at least one determined merchants that have the indicated item in current inventory.

46. The non-transitory computer-readable medium of claim 45 wherein the automatic contacting of the human representative of at least one merchant to query if the merchant has the indicated item in the current inventory of the merchant is performed by telephoning the human representative and using automated interactive voice recognition.

47. The non-transitory computer-readable medium of claim 46 wherein the received request further includes one or more indications of one or more questions specified by the user, wherein the querying of a human representative of a merchant includes obtaining answers from the human representative to the specified questions, and wherein the providing of information to the user includes providing to the user the obtained answers to the user-specified questions.

48. The non-transitory computer-readable medium of claim 45 wherein the querying of a human representative of a merchant obtains current information for the merchant that includes at least one of current pricing information for the indicated item from the merchant and of quantity information for current in-stock copies of the indicated item at the merchant and of current availability of the indicated item for a substantially immediate retrieval by the user from the merchant, and wherein the providing of information to the user includes indicating to the user the obtained current information for the merchant.

49. The non-transitory computer-readable medium of claim 45 wherein identifying of each of the one or more local merchants includes using yellow page listing information for the merchant.

50. The non-transitory computer-readable medium of claim 45 wherein the determining of the at least one local merchant that has the indicated item in current inventory includes providing information to the user regarding at least one local merchant that potentially may have the indicated item in current inventory, and receiving one or more indications from the user of one or more selected merchants from the indicated merchants presented to the user, and wherein the one or more local merchants whose human representatives are contacted include the selected merchants.

51. The non-transitory computer-readable medium of claim 45 wherein the computer-readable medium is a memory of the programmed computing device, and wherein the contents are software instructions that when executed program the computing device to perform the method.

52. A computing system programmed to determine local merchants having current availability to provide an indicated item, comprising:
one or more processors;
one or more modules configured to, when executed by at least one of the one or more processors:
receive a request from a user to identify one or more local merchants that have an indicated item in current inventory;
determine at least one local merchant that has the indicated item in current inventory by, for each of one or more local merchants that potentially may have the indicated item in current inventory of the merchant, automatically contacting a human representative of the merchant to query if the merchant has the indicated item in the current inventory of the merchant, and wherein the determining of the at least one local merchants that has the indicated item in current inventory further includes, for each of one or more other local merchants that are distinct from the one or more local merchants that potentially may have the indicated item in current inventory of the merchant, selecting the other local merchant as one of the determined local merchants that has the indicated item in current inventory, the selecting being based on information previously obtained from contacting a human representative of the other local merchant on behalf of another user, and wherein, for at least one of the one or more other local merchants, the previously obtained information was obtained for the indicated item in response to a request from another user for the indicated item; and
provide information to the user to indicate one or more of the at least one determined merchants that have the indicated item in current inventory.

53. The computing system of claim 52 wherein the automatic contacting of the human representative of at least one merchant to query if the merchant has the indicated item in the current inventory of the merchant is performed by telephoning the human representative and using automated interactive voice recognition.

54. The computing system of claim 53 wherein the received request further includes one or more indications of one or more questions specified by the user, wherein the querying of a human representative of a merchant includes obtaining answers from the human representative to the specified questions, and wherein the providing of information to the user includes providing to the user the obtained answers to the user-specified questions.

55. The computing system of claim 52 wherein the querying of a human representative of a merchant obtains current information for the merchant that includes at least one of current pricing information for the indicated item from the merchant and of quantity information for current in-stock copies of the indicated item at the merchant and of current availability of the indicated item for a substantially immediate retrieval by the user from the merchant, and wherein the providing of information to the user includes indicating to the user the obtained current information for the merchant.

56. The computing system of claim 52 wherein identifying of each of the one or more local merchants includes using yellow page listing information for the merchant.

57. The computing system of claim 52 wherein the determining of the at least one local merchant that has the indicated item in current inventory includes providing information to the user regarding at least one local merchant that potentially may have the indicated item in current inventory, and receiving one or more indications from the user of one or more selected merchants from the indicated merchants presented to the user, and wherein the one or more local merchants whose human representatives are contacted include the selected merchants.

58. The computing system of claim 52 wherein the one or more modules each includes software instructions for execution by the at least one processors of the computing system.

* * * * *